(12) United States Patent  
Vinogradov et al.

(10) Patent No.: US 7,686,223 B2
(45) Date of Patent: Mar. 30, 2010

(54) SELECTABLE AIMING PATTERN FOR AN IMAGING-BASED BAR CODE READER

(75) Inventors: Igor Vinogradov, New York, NY (US); Miroslav Trajkovic, Coram, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 219 days.

(21) Appl. No.: 11/848,638

(22) Filed: Aug. 31, 2007

(65) Prior Publication Data

US 2009/0057413 A1 Mar. 5, 2009

(51) Int. Cl.
*G06K 9/24* (2006.01)

(52) U.S. Cl. ............................ 235/462.21; 235/462.2; 235/462.22; 235/462.41

(58) Field of Classification Search ............. 235/462.21
See application file for complete search history.

(56) References Cited

U.S. PATENT DOCUMENTS

| | | | |
|---|---|---|---|
| 5,479,011 A | * | 12/1995 | Rudeen et al. .............. 250/235 |
| 5,600,119 A | * | 2/1997 | Dvorkis et al. ........... 235/462.1 |
| 6,021,106 A | | 2/2000 | Welch et al. |
| 6,053,413 A | * | 4/2000 | Swift et al. ............. 235/472.01 |
| 6,128,134 A | | 10/2000 | Feldman et al. |
| 6,633,433 B2 | | 10/2003 | Bergstein et al. |
| 6,814,288 B2 | | 11/2004 | Gurevich et al. |
| 2005/0284942 A1 | | 12/2005 | Gurevich et al. |
| 2006/0038017 A1 | | 2/2006 | Carlson et al. |

* cited by examiner

*Primary Examiner*—Steven S Paik
*Assistant Examiner*—Christopher Stanford

(57) ABSTRACT

An aiming pattern assembly (60) for an imaging-based bar code reader (10) including: a light source assembly (62) generating focused light; a pattern shaping assembly (66) receiving focused light from the light source assembly (62) and including a first area (66a) and a non-overlapping second area (66b), focused light passing through the first area (66a) creating a first aiming pattern (P1) projected toward a field of view (FV) and passing through the second area (66b) creating a second aiming pattern (P2) projected toward the field of view (FV); and a pattern selection assembly (68) receiving the first and second aiming patterns (P1, P2) and passing at least one of the first and second aiming patterns (P1, P2).

23 Claims, 10 Drawing Sheets

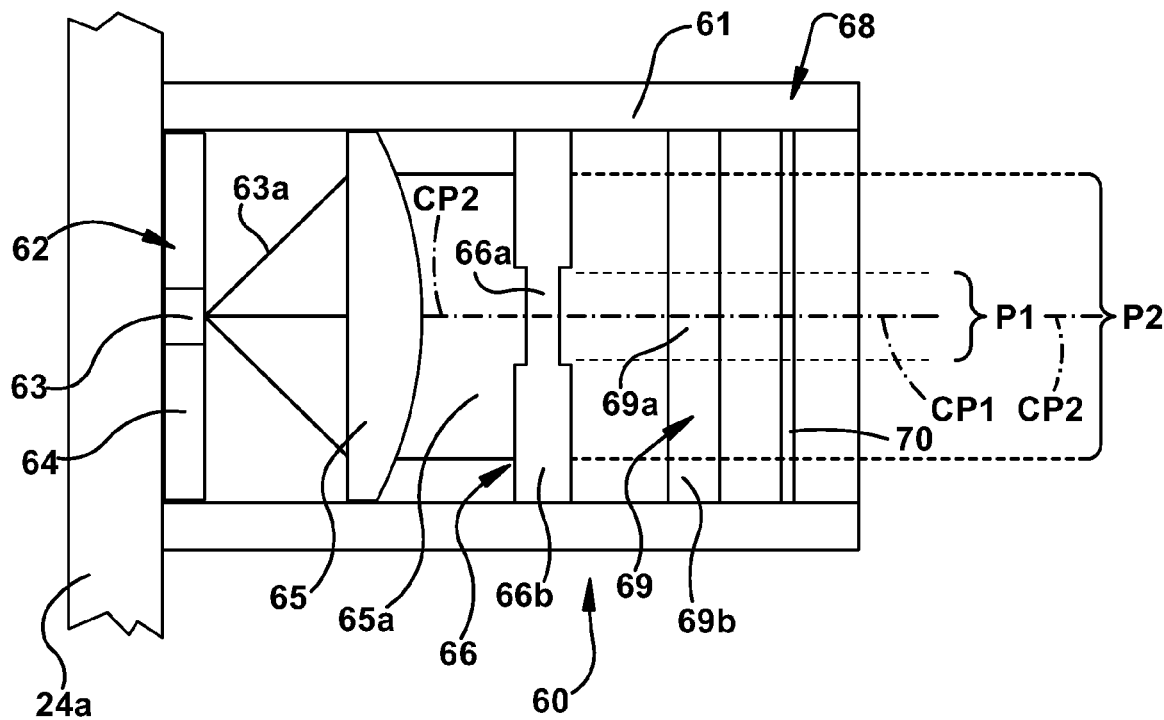
Fig. 6
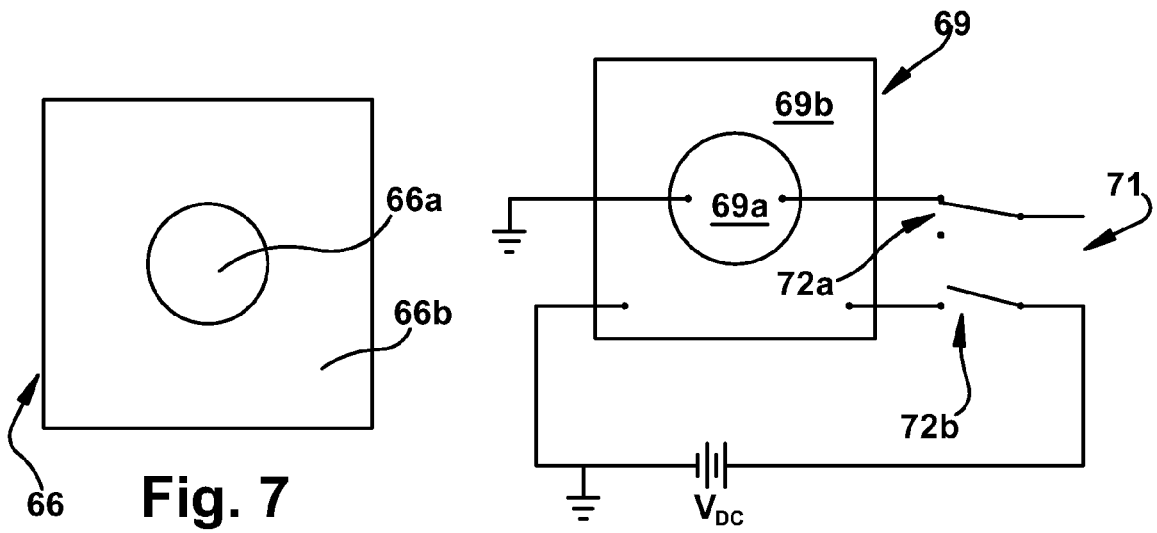
Fig. 7
Fig. 8

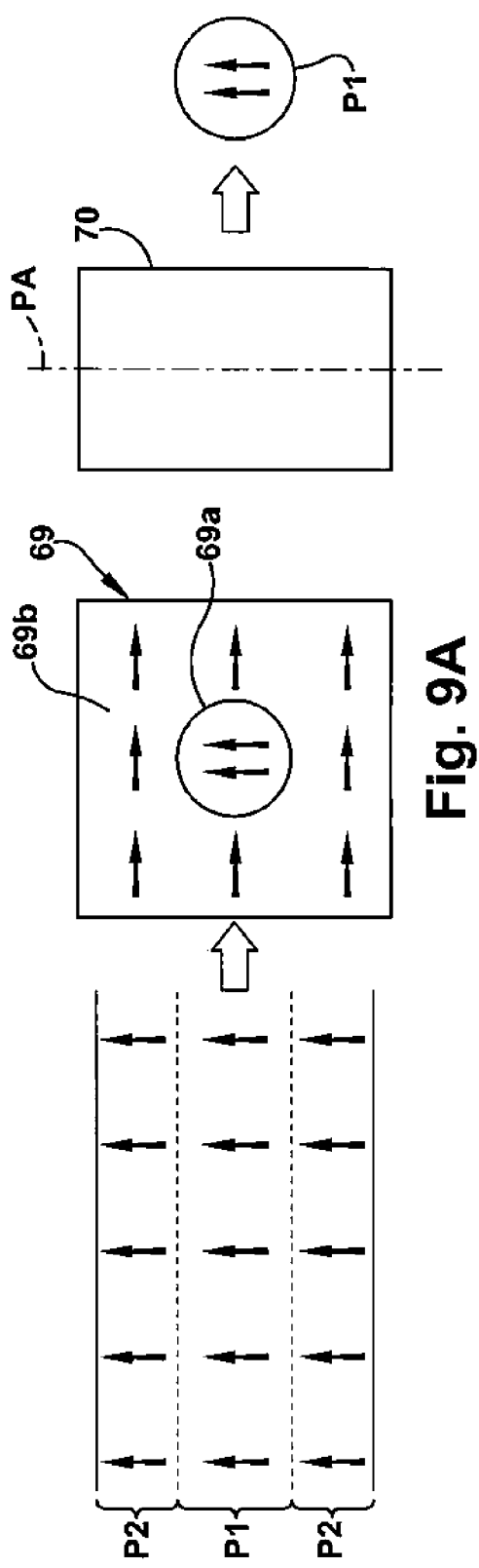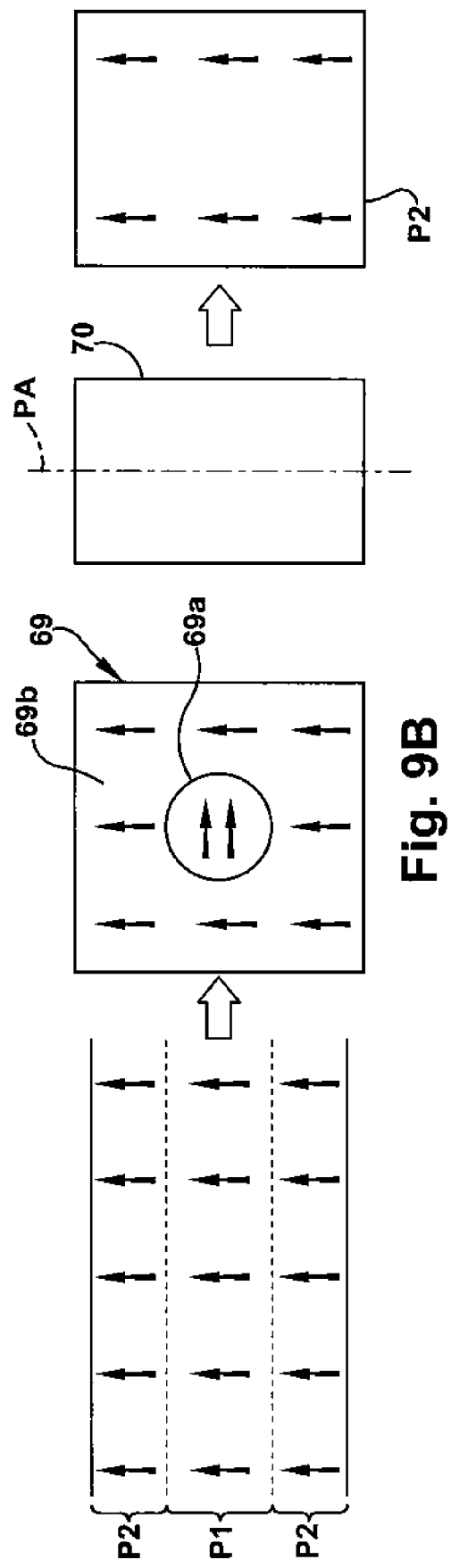

SELECTABLE AIMING PATTERN FOR AN IMAGING-BASED BAR CODE READER

FIELD OF THE INVENTION

The present invention relates to an aiming pattern assembly for an imaging-based bar code reader and, more particularly, to an aiming pattern assembly for an imaging-based bar code reader selectively providing at least two different aiming patterns for near and far target distances.

BACKGROUND ART

Various electro-optical systems have been developed for reading optical indicia, such as bar codes. A bar code is a coded pattern of graphical indicia comprised of a series of bars and spaces of varying widths, the bars and spaces having differing light reflecting characteristics. Some of the more popular bar code symbologies include: Uniform Product Code (UPC), typically used in retail stores sales; Data Matrix, typically used for labeling small electronic products; Code 39, primarily used in inventory tracking; and Postnet, which is used for encoding zip codes for U.S. mail. Bar codes may be one dimensional (ID), i.e., a single row of graphical indicia such as a UPC bar code or two dimensional (2D), i.e., multiple rows of graphical indicia comprising a single bar code, such as Data Matrix which comprising multiple rows and columns of black and white square modules arranged in a square or rectangular pattern.

Systems that read bar codes (bar code readers) electro-optically transform the graphic indicia into electrical signals, which are decoded into alphanumerical characters that are intended to be descriptive of the article or some characteristic thereof. The characters are then typically represented in digital form and utilized as an input to a data processing system for various end-user applications such as point-of-sale processing, inventory control and the like.

Bar code readers that read and decode bar codes employing imaging systems are typically referred to as imaging-based bar code readers or bar code scanners. Imaging systems include charge coupled device (CCD) arrays, complementary metal oxide semiconductor (CMOS) arrays, or other imaging sensor arrays having a plurality of photosensitive elements (photosensors) defining image pixels. An illumination apparatus or system comprising light emitting diodes (LEDs) or other light source directs illumination toward a target object, e.g., a target bar code. Light reflected from the target bar code is focused through a system of one or more lens of the imaging system onto the sensor array. Thus, the target bar code within a field of view (FV) of the imaging lens system is projected on the sensor array.

Periodically, the pixels of the sensor array are sequentially read out generating an analog signal representative of a captured image frame. The analog signal is amplified by a gain factor and the amplified analog signal is digitized by an analog-to-digital converter. Decoding circuitry of the imaging system processes the digitized signals representative of the captured image frame and attempts to decode the imaged bar code.

Imaging-based bar code readers which are portable, as opposed to a fixed mounted or stationary reader, typically have housings that designed to be held by a user in his or her hand and pointed at a target bar code by the user to image and decode the target bar code. To facilitate the user appropriately pointing or aiming the bar code reader at the target bar code, readers are often provided with an aiming pattern assembly which generates a visible aiming pattern. The generated aiming pattern may be a visible dot projected approximately in the middle of the field of view FV of the imaging system. Alternately, the generated aiming pattern may be a visible crosshair aiming pattern with the vertex of the crosshair pattern projected approximately in the middle of the field of view FV of the imaging system. Yet another alternative would be for the generated aiming pattern to comprise a rectangular or circular pattern of visible illumination whose center is projected approximately in the middle of the field of view FV of the imaging assembly and whose outer periphery approximates a periphery of the field of view FV, referred to herein as a block-type aiming pattern. A block-type aiming pattern indicates to the user the extent of the field of view FV so that the user can appropriately aim the reader housing such that the target bar code is within the bounds of the imaging assembly field of view FV.

The aiming pattern assembly is typically offset from the imaging system that is perpendicular to an optical axis of the imaging system. Because the aiming pattern assembly is not coaxially aligned with the imaging system in the reader housing, this results in parallax between the imaging system field of view FV and the aiming pattern. While there may be one target distance at which a center of the aiming pattern and a center of the field of view FV of the imaging assembly are congruent, because of parallax, at other target distances, the center of the aiming pattern will be shifted with respect to the center of the field of view FV. Additionally, for a block-type aiming pattern, because of parallax, the peripheral bounds of the aiming pattern will not correspond with the peripheral bounds of the field of view FV.

As reader imaging systems are improved to have greater and greater working ranges (WR), that is, the ability to read target bar codes over distances from a few centimeters from the front of the imaging system to distances of several meters from the imaging system, the impact of the parallax error on the lack of congruency between the aiming pattern and the field of view FV is exacerbated. For example, one way to increase the effective working range WR of an imaging system is move from a fixed focus lens system to a variable focus lens system. In a fixed focus system, the field of view FV and the working range WR of the imaging system is fixed. The working range WR of an imaging system is a distance range in front of or forward of the imaging lens assembly within which a target object of interest, such as a target bar code, may be successfully imaged and decoded by the imaging system decoding circuitry.

The working range WR and field of view FV require a user to move the bar code reader relative to the target bar code such that the target bar code is within the field of view FV and within the working range WR of the imaging system for successful decoding of the imaged target bar code. At the near and far limits of the working range WR, there is a problem with blurriness, that is, poor resolution of the imaged target bar code. A variable focus lens system addresses the blurriness problem at the limits of the working range WR by providing for readjustment/refocusing of the lens system. This readjustment/refocusing of the lens system facilitates obtaining an in-focus image of a target bar code focused onto the sensor array, thus, mitigating blurriness at the limits of the working range WR. A disclosure of a variable focus lens assemblies is presented in U.S. patent application Ser. No. 11/756,052, filed May 31, 2007 and entitled "Variable Focus Imaging Lens Assembly For An Imaging-Based Bar Code Reader". The aforesaid '052 application is assigned to the assignee of the present invention and is incorporated herein in its entirety by reference.

In addition to parallax, a variable focus imaging lens assembly adds additional complications to problem of the aiming pattern being congruent with the imaging assembly field of view FV. For example, in a variable focus imaging lens assembly that employs a zoom lens, the angle of the field of view FV varies between a narrow angle field of view and a wide angle field of view depending on the position zoom lens. Accordingly, a block-type aiming pattern that is appropriate for a narrow angle field of view FV would be inappropriate for a wide angle field of view FV. That is, the periphery of the block-type aiming pattern would not accurately represent both the bounds of the narrow angle field of view and the wide angle field of view.

What is needed is an aiming pattern assembly for an imaging-base bar code reader that provides for multiple aiming patterns whose center lines more accurately correspond to a center line of the field the field of view FV over the working range WR of the imaging system. What is also needed is an aiming pattern assembly for an imaging-base bar code reader that provides for multiple aiming patterns that more accurately correspond to the field of view FV over the working range WR of the imaging system. What is also needed is an aiming pattern assembly for an imaging-base bar code reader that provides for multiple aiming patterns that more accurately correspond to wide and narrow angle fields of view FV over the working range WR of the imaging system when a zoom lens imaging system is utilized.

SUMMARY

In one aspect, the present invention features an aiming pattern assembly for an imaging-based bar code reader wherein the bar code reader includes an imaging system generating image frames of a target object within a field of view and having a working range over which a target bar code within the field of view is capable of being imaged and decoded, the working range being subdivided into a near range and a non-overlapping far range, the near range being closer to the reader and the far range being further from the reader. In one exemplary embodiment, the aiming pattern assembly includes:

a light source assembly generating focused light;

a pattern shaping element receiving focused light from the light source assembly and including a first area and a non-overlapping second area, focused light passing through the first area creating a first aiming pattern projected toward the field of view and passing through the second area creating a second aiming pattern projected toward the field of view, a center line of the first aiming pattern intersecting a center line of the field of view within the near range of the working range and a center line of the second aiming pattern intersecting the center line of the field of view within the far range of the working range; and a pattern selection assembly receiving the first and second aiming patterns and passing at least one of the first and second aiming patterns.

In one exemplary embodiment, the pattern selection assembly passes a selected one of the first and second aiming patterns and blocks the other of the first and second aiming patterns. In one exemplary embodiment, the pattern selection assembly passes the first aiming pattern when a target bar code is determined to be within the near range of the working range and passes the second aiming pattern when a target bar code is determined to be within the far range of the working range.

In one exemplary embodiment, light source assembly generates polarized light and includes a laser light source and a collimating lens for focusing light emitted by the laser light source. In one exemplary embodiment, the pattern selection assembly comprises a liquid crystal element and a polarizing filter. In one exemplary embodiment, the laser light source emits light within the visible spectrum.

In one aspect, the present invention features an imaging-based bar code reader. In one exemplary embodiment, the bar code reader includes:

an imaging system generating image frames of a target object within a field of view and having a working range over which a target bar code within the field of view is capable of being imaged and decoded, the working range being subdivided into a near range and a non-overlapping far range, the near range being closer to the reader and the far range being further from the reader; and an aiming pattern assembly for generating a visible aiming pattern to facilitate aiming the reader at the target bar code, the aiming pattern assembly including:

a light source assembly generating focused light;

a pattern shaping element position receiving focused light from the light source assembly and including a first area and a non-overlapping second area, light passing through the first area creating a first aiming pattern projected toward the field of view and passing through the second area creating a second aiming pattern projected toward the field of view, a center line of the first aiming pattern intersecting a center line of the field of view within the near range of the working range and a center line of the second aiming pattern intersecting the center line of the field of view within the far range of the working range; and a pattern selection assembly receiving the first and second aiming patterns and passing at least one of the first and second aiming patterns.

In one exemplary embodiment, the pattern selection assembly passes a selected one of the first and second aiming patterns and blocks the other of the first and second aiming patterns. In one exemplary embodiment, the pattern selection assembly passes the first aiming pattern when a target bar code is determined to be within the near range of the working range and passes the second aiming pattern when a target bar code is determined to be within the far range of the working range.

In one exemplary embodiment, light source assembly generates polarized light and includes a laser light source and a collimating lens for focusing light emitted by the laser light source. In one exemplary embodiment, the pattern selection assembly comprises a liquid crystal element and a polarizing filter. In one exemplary embodiment, the light emitted by the laser light source is in the visible spectrum.

In one exemplary embodiment of the present invention, the aiming pattern assembly is offset from the imaging lens assembly of the imaging system in a direction that is perpendicular to an optical axis of the imaging system. Focused light emitted by the light source assembly is received by a pattern shaping element. The pattern shaping element may be diffractive or refractive and includes two non-overlapping zones or regions. Light that passes through the first zone of the pattern shaping element is focused or shaped into a first aiming pattern P1, while light that passes through the second zone of the pattern shaping element is focused or shaped into a second aiming pattern. Each zone of the pattern shaping element may include a desired optical power to provide a desired aiming pattern size at respective target distances.

The first aiming pattern is focused and directed such that a center line of the pattern P1 will intersect a center line of the field of view FV of the imaging system within the near working range. Stated another way, the center line of the first aiming pattern intersects a plane through a center line of the field of view within the near range of the working range, the plane being orthogonal to the offset direction and a center line of the second aiming pattern intersecting the plane through the center line of the field of view within the far range of the working range These and other objects, advantages, and features of the exemplary embodiments are described in detail in conjunction with the accompanying drawings.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, in which:

FIG. 6 is a schematic side elevation view of an exemplary embodiment of an aiming pattern assembly of the present invention capable of generating a plurality of visible aiming patterns;

FIG. 7 is a schematic front elevation view of a pattern shaping element of the aiming pattern assembly of FIG. 6;

FIG. 8 is a schematic front elevation view of a liquid crystal element of a pattern selection assembly of the aiming pattern assembly of FIG. 6;

FIGS. 9A and 9B are schematic representations of the effect on direction of polarization of the aiming patterns of the aiming pattern assembly of FIG. 6 as the aiming patterns pass through a liquid crystal element of the aiming pattern assembly;

DETAILED DESCRIPTION

Figure 1:
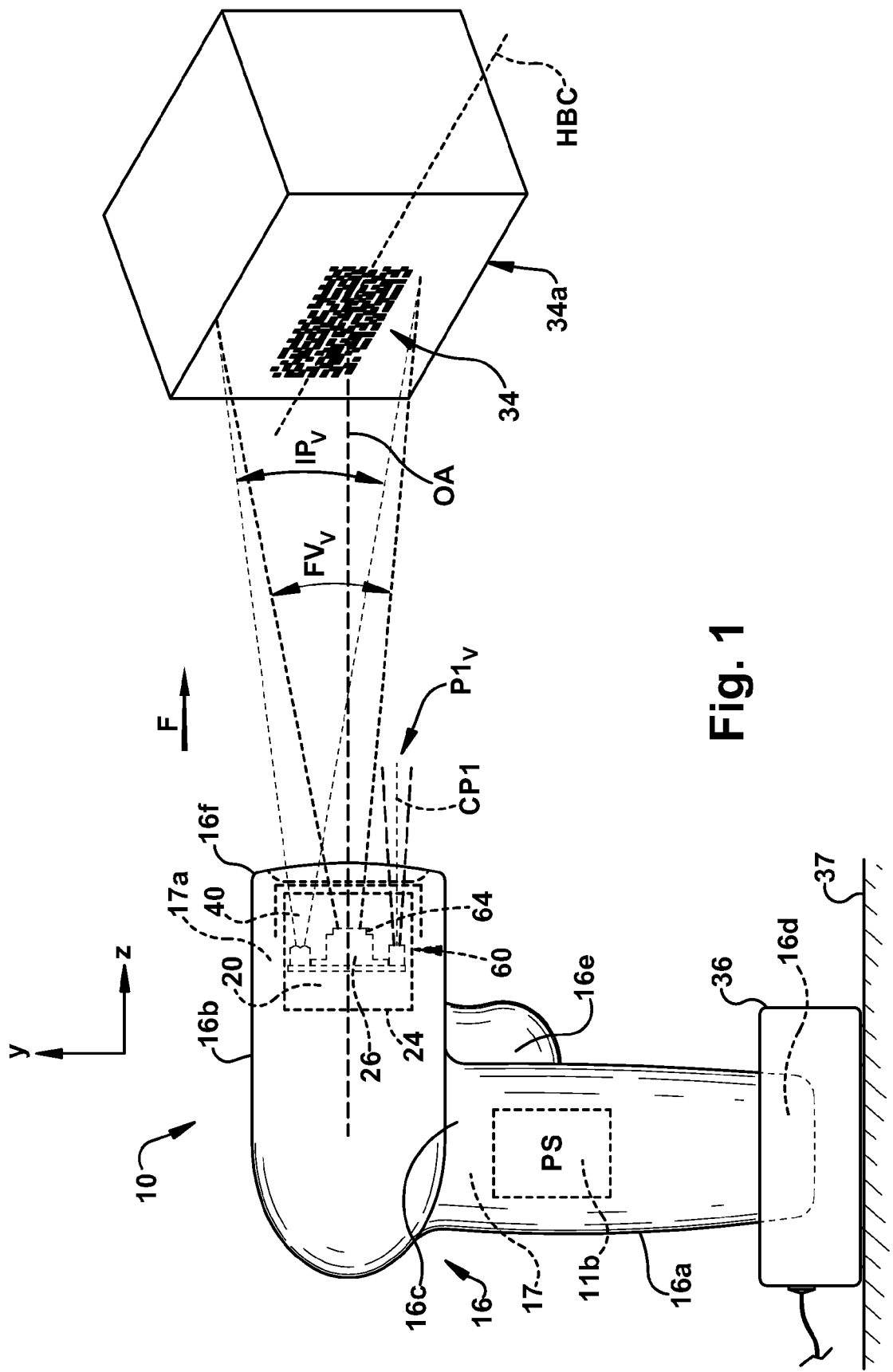
FIG. 1 is a schematic side elevation view of an exemplary embodiment of an imaging-based bar code reader of the present invention.
Figure 2:
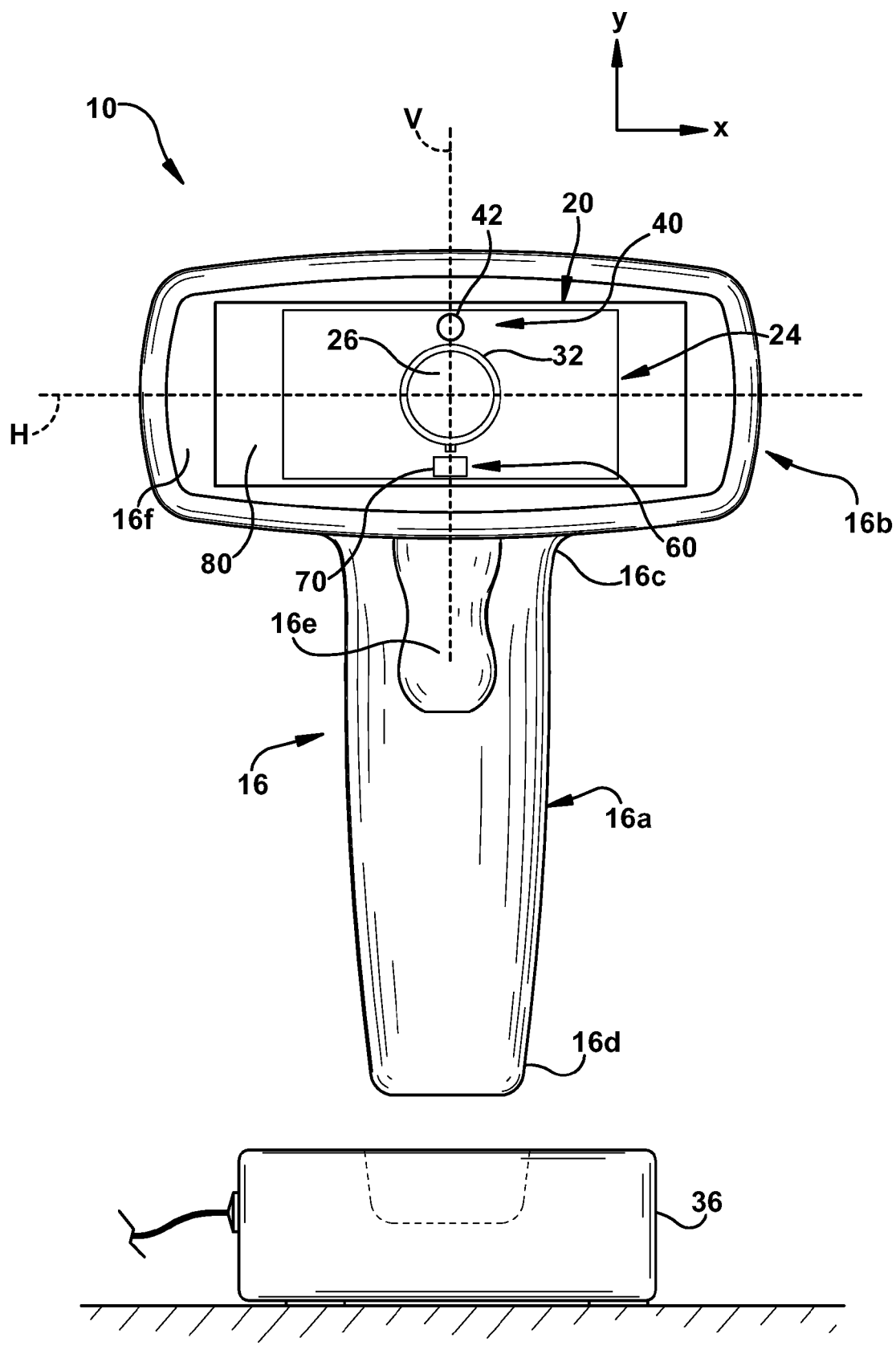
FIG. 2 is a schematic front elevation view of the bar code reader of FIG. 1.

A first exemplary embodiment of an imaging-based bar code reader of the present invention is shown schematically at 10 in FIGS. 1-6. The bar code reader 10 includes an imaging system 12 and a decoding system 14 mounted in a housing 16. The reader 10 is capable of reading, that is, imaging and decoding bar codes. The imaging system 12 is adapted to capture image frames of a field of view FV of the imaging system 12 and the decoding system 14 is adapted to decode encoded indicia within a captured image frame. The housing 16 supports circuitry 11 of the reader 10, including the imaging and decoding systems 12, 14 within an interior region 17 of the housing 16. The housing 16 also supports an illumination assembly 40 for illuminating the field of view FV and an aiming pattern assembly 60 to facilitate a user properly aiming the housing 16 at a target object, such as a target bar code 34. Advantageously, as will be discussed below, the aiming pattern assembly 60 of the present invention generates a plurality of aiming patterns P1, P2 to compensate for parallax between the aiming pattern assembly and the imaging system 12.

The imaging system 12 comprises a modular scan engine or imaging camera assembly 20 and associated imaging circuitry 22 supported within a housing 24. The camera assembly 20 may, but does not have to be, modular in that the housing 24 may be removed or inserted as a unit into the reader 10, allowing the ready substitution of camera assemblies having different imaging characteristics, e.g., camera assemblies having different working ranges and different fields of view. A working range WR is a distance range in front of or forward (in a direction F in FIG. 1) of the camera assembly 20 within which a target object of interest, such as a target bar code 34, may be successfully imaged and decoded. Typically, the target bar code 34 is imprinted on or affixed to a product or product package 34a.

The imaging camera assembly 20 may be a board camera in which a vertically oriented printed circuit board 24a of the housing 24 supports an imaging lens assembly 26 and a sensor or pixel array 28. The imaging lens assembly 26 may be a fixed focus or a variable focus assembly. The imaging lens assembly 26 includes a lens assembly 30 supported within a lens holder 32. The lens assembly 30 comprises one or more fixed lenses and/or one or more variable focus lens. The lens holder 32 is, in turn, supported by a shroud 34 which prevents ambient illumination from reaching the sensor array 28. The lens assembly 30 defines an optical axis OA and focus illumination from the field of view FV onto the sensor array 28.

The sensor array 28 is enabled during an exposure period to capture an image of a target object, such as a target bar code 34, within the field of view FV of the imaging system 12. The field of view FV of the imaging system 12 is a function of both the configuration of the sensor array 28 and the lens assembly 26 and the distance and orientation between the array 28 and the lens assembly 26.

In one exemplary embodiment, the imaging system 12 is a two dimensional (2D) imaging system and the sensor array 28 is a 2D sensor array. It should be understood, however, that the present invention is equally applicable to a linear or one dimensional imaging system having a ID linear sensor array.

Figure 3:
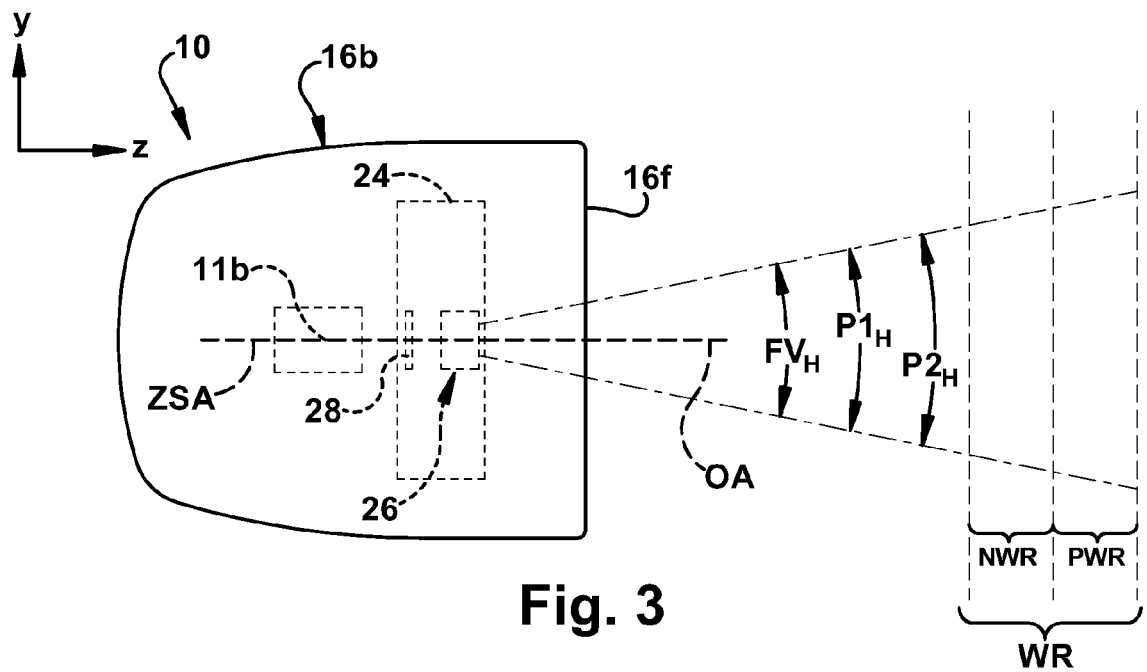
FIG. 3 is a schematic top plan view of the bar code reader of FIG. 1.
Figure 4:
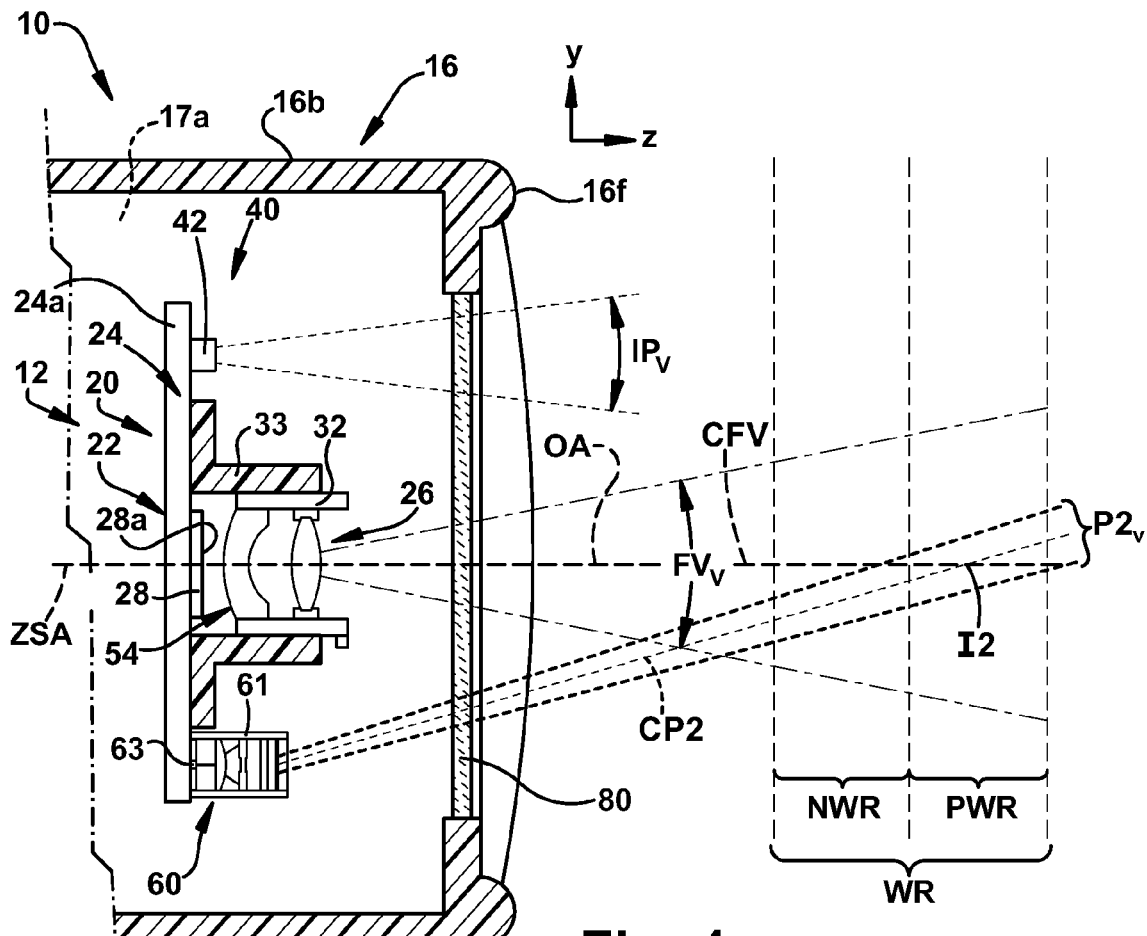
FIG. 4 is a schematic view partly in section and partly in side elevation of a camera assembly of an imaging assembly of the bar code reader of FIG. 1.

The imaging system field of view FV (shown schematically in FIG. 5) includes both a horizontal and a vertical field of view, the horizontal field of view being shown schematically as FVH in FIG. 3 and the vertical field of view being shown schematically as FVV in FIGS. 1 and 4. The sensor array 28 is primarily adapted to image 1D and 2D bar codes, for example, a 2D bar code as shown in FIG. 1 which extends along a horizontal axis HBC and includes multiple rows of indicia comprising a multi-row, multi-column array of dark bars and white spaces. However, one of skill in the art would recognize that the present invention is also applicable to image postal codes, signatures, etc.

The housing 16 includes a gripping portion 16a adapted to be grasped by an operator's hand and a forward or scanning head portion 16b extending from an upper part 16c of the gripping portion 16a. A lower part 16d of the gripping portion 16a is adapted to be received in a docking station 36 positioned on a substrate 37 such as a table or sales counter. The scanning head 16b supports the imaging system 12 within an interior region 17a (FIG. 4) of the scanning head 16b. As can best be seen in FIG. 2, looking from the front of the housing 16, the scanning head 16b is generally rectangular in shape and defines a horizontal axis H and a vertical axis V. The vertical axis V being aligned with a general extent of the gripping portion 16a.

Advantageously, the reader 10 of the present invention is adapted to be used in both a hand-held mode and a fixed position mode. In the fixed position mode, the housing 16 is received in the docking station 36 and a target object such as the target bar code 34 (FIG. 1) is brought within the field of view FV of the reader's imaging system 12 in order to have the reader 10 read the target bar code 34. The imaging system 12 is typically always on or operational in the fixed position mode to image and decode any target bar code presented to the reader 10 within the field of view FV. The docking station 36 is plugged into an AC power source and provides regulated DC power to circuitry 11 of the reader 10. Thus, when the reader 10 is in the docking station 36 power is available to keep the imaging system 12 on continuously.

In the hand-held mode, the housing 14 is removed from the docking station 36 so the reader 10 can be carried by an operator or user and positioned such that the target bar code 34 is within the field of view FV of the imaging system 12. In the hand-held mode, imaging and decoding of the target bar code 34 is instituted by the operator depressing a trigger 16e extending through an opening near the upper part 16c of the gripping portion 16a.

Figure 5:
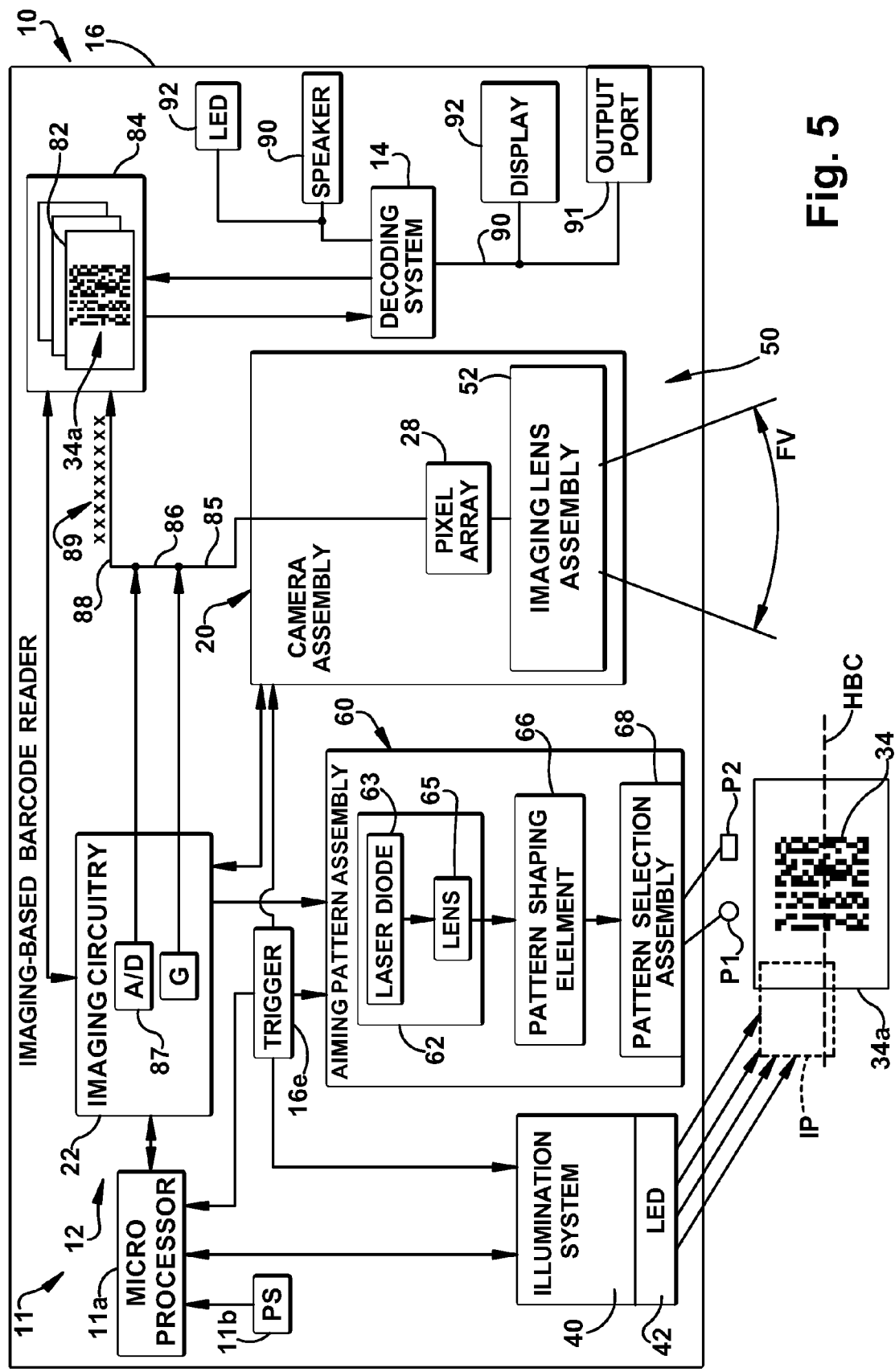
FIG. 5 is a schematic block diagram of the bar code reader of FIG. 1.

The imaging system 12 is part of the bar code reader circuitry 11 which operates under the control of a microprocessor 11a (FIG. 5). When removed from the docking station 30, power is supplied to the imaging and decoding systems 12, 14 by a power supply 11b. The imaging and decoding systems 12, 14 of the present invention may be embodied in hardware, software, electrical circuitry, firmware embedded within the microprocessor 11a or the modular camera assembly 20, on flash read only memory (ROM), on an application specific integrated circuit (ASIC), or any combination thereof.

The imaging circuitry 22 may be disposed within, partially within, or external to the camera assembly housing 24. A back end of the housing 24 may comprise a printed circuit board 24a, which forms part of the imaging circuitry 22 and extends vertically to also support the illumination assembly 40 and the aiming pattern assembly 60 (best seen in FIG. 4).

The camera housing 24 is supported within the scanning head interior region 17a in proximity to a transparent window 80 (FIG. 4) defining a portion of a front wall 16f of the scanning head 16b. The window 80 is oriented such that its horizontal axis is substantially parallel to the scanning head horizontal axis H. The vertical axis of the window 80 may be tilted slightly from the vertical axis V to avoid specula reflection. Specula reflection would occur if, for example, a virtual image of the illumination assembly 40 were to be projected by the exit window 80 within the field of view FV of the imaging system 12.

Sensor Array 28

The imaging system 12 includes the sensor array 28 of the imaging camera assembly 20. The sensor array 28 comprises a charged coupled device (CCD), a complementary metal oxide semiconductor (CMOS), or other imaging pixel array, operating under the control of the imaging circuitry 22. In one exemplary embodiment, the sensor array 28 comprises a two dimensional (2D) mega pixel CMOS array with a typical size of the pixel array being on the order of 1280×1024 pixels. Each pixel is comprised of a photosensitive element or photosensor that receives light and stores a charge proportional to the intensity of the light received and then is periodically discharged to generate an electrical signal whose magnitude is representative of the charge on the photosensitive element during an exposure period.

The illumination-receiving pixels of the sensor array 28 define a light receiving sensor array surface 28a (best seen in FIG. 4). The sensor array 28 is secured to the printed circuit board 24a, in parallel direction for stability. The sensor array surface 28a is substantially perpendicular to the optical axis OA of the lens assembly 52, that is, a z axis (labeled ZSA in FIG. 4) that is perpendicular to the sensor array surface 28a would be substantially parallel to the optical axis OA of the lens assembly 52. The pixels of the sensor array surface 28a are disposed substantially parallel to the horizontal axis H of the scanning head 16b.

As is best seen in FIG. 4, the lens assembly 26 focuses light reflected and scattered from the target bar code 34 onto the sensor array surface 28a of the sensor array 28. Thus, the lens assembly 26 focuses an image 34a of the target bar code 34 (assuming it is within the field of view FV) onto the array of pixels comprising the sensor array 28.

Illumination Apparatus 40

The bar code reader 10 includes the illumination apparatus 40 to illuminate the field of view FV so that the image 34a of the target bar code 34 is suitable for decoding. The illumination apparatus 40 may include one or more illumination sources 42 (FIGS. 4 and 5) such as surface mount LED (or a cold cathode lamp (CFL)) which is energized to generate an illumination pattern IP (shown schematically in FIG. 5) that fills or substantially coincides with the field of view FV of the imaging system 12. It should be understood that depending on the specifics of the reader and the environmental conditions under which the reader will be used, an illumination assembly 40 may be utilized having more than one illumination source, one or more focusing lens, an one or more apertures positioned between the LEDs and the focusing lenses.

Operation of Imaging and Decoding Systems 12, 14

When actuated to read the target bar code 34, the imaging system 12 captures a series of image frames 82 (FIG. 5) which are stored in a memory 84. Assuming the target bar code 34 is within the field of view FV, each image frame 82 includes the image 34a of the target bar code 34 (shown schematically in FIG. 5). The decoding system 14 decodes a digitized version of the imaged bar code 34a.

Electrical signals are generated by reading out of some or all of the pixels of the sensor array 28 after an exposure period. After the exposure time has elapsed, some or all of the pixels of sensor array 28 are successively read out thereby generating an analog signal 85 (FIG. 4). In some sensors, particularly CMOS sensors, all pixels of the sensor array 28 are not exposed at the same time, thus, reading out of some pixels may coincide in time with an exposure period for some other pixels.

The analog image signal 85 represents a sequence of photosensor voltage values, the magnitude of each value representing an intensity of the reflected light received by a photosensor/pixel during an exposure period. The analog signal 85 is amplified by a gain factor, generating an amplified analog signal 86. The imaging circuitry 22 further includes an analog-to-digital (A/D) converter 87. The amplified analog signal 78 is digitized by the A/D converter 87 generating a digitized signal 88. The digitized signal 88 comprises a sequence of digital gray scale values 89 typically ranging from 0-255 (for an eight bit processor, i.e., $2^8$=256), where a 0 gray scale value would represent an absence of any reflected light received by a pixel during an exposure or integration period (characterized as low pixel brightness) and a 255 gray scale value would represent a very high intensity of reflected light received by a pixel during an exposure period (characterized as high pixel brightness).

The digitized gray scale values 89 of the digitized signal 88 are stored in the memory 84. The digital values 89 corresponding to a read out of the sensor array 28 constitute the image frame 82, which is representative of the image projected by the focusing lens 26 onto the sensor array 28 during an exposure period. If the field of view FV of the imaging lens assembly 26 includes the target bar code 34, then a digital gray scale value image 34a of the target bar code 34 would be present in the image frame 82.

The decoding circuitry 14 then operates on the digitized gray scale values 89 of the image frame 82 and attempts to decode any decodable image within the image frame, e.g., the imaged target bar code 34a. If the decoding is successful, decoded data 90, representative of the data/information coded in the bar code 34 is then output via a data output port 91 and/or displayed to a user of the reader 10 via a display 92. Upon achieving a good "read" of the bar code 34, that is, the imaged bar code 34a was successfully imaged and decoded, a speaker 93 and/or an indicator LED 94 is activated by the bar code reader circuitry 11 to indicate to the user that the target bar code 34 has successfully read, that is, the target bar code 34 has been successfully imaged and the imaged bar code 34a has been successfully decoded. If decoding is unsuccessful, a successive image frame of the series of image frame 82 is selected and the decoding process is repeated until a successful decode is achieved.

Aiming Pattern Assembly 60

Figure 11A:
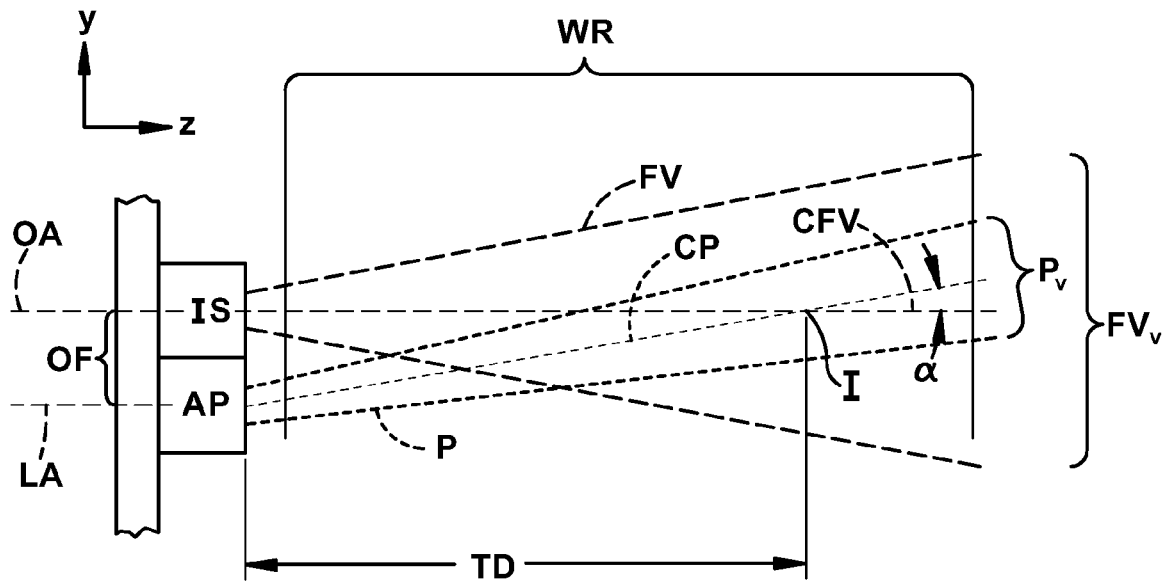
FIGS. 11A and 11B are schematic representations of parallax between an imaging system and an aiming pattern assembly of a prior art imaging-based bar code reader.

As noted previously, parallax causes an aiming pattern to be non-congruent with respect to the field of view FV of the imaging system. This parallax problem is illustrated in prior art FIGS. 11A and 11B. Assume a prior art imaging system IM has a field of view FV and a working range WR. Further assume a prior art aiming pattern assembly AP generates an aiming pattern P. As can be seen in FIG. 11A, because the imaging system IM and the aiming pattern assembly AP are not coaxial with respect to the vertical direction Y, a longitudinal axis LA of the aiming pattern assembly AP is offset (labeled OF in FIG. 11A) from an optical axis OA of the imaging system IM. The imaging system IM has a field of view FV (which in the side elevation view of FIG. 11A is seen as a vertical plane FVV—vertical field of view). Assume that a center line through the field of view FV is a line labeled CFV in FIGS. 11A & 11B. Generally, the center line CFV of the field of view FV would be collinear with the optical axis OA of the imaging system IM.

In the particular example of FIG. 11A, the imaging system IM and the aiming pattern assembly AP are offset in a vertical direction, that is, with respect to or along the Y axis. As is shown in FIG. 1B, it is assumed that the imaging system IM and the aiming pattern assembly are not offset with respect to the horizontal or X axis. If on the other hand, the imaging system IM and the aiming pattern assembly AP were offset with respect to the X axis but aligned with respect to the Y axis (as if FIGS. 11A & 11B were swapped), then the parallax with be with respect to the X axis and none with respect to the Y axis.

Returning to FIG. 11A, as can be seen, because of the offset OF and the resulting parallax with respect to the Y axis, a center line CP of the aiming pattern P generated by the aiming pattern assembly AP is not congruent with a center line CFV of the imaging system field of view FV, indeed, the aiming pattern center line CP is at an angle α with respect to the field of view center line CFV. In the schematic example shown in FIG. 11A, the center line CP of the aiming pattern P intersects the center line CFV of the field of view at point I within the working range WR, that is, at a target distance TD from the imaging system IS within the working range WR. However, if the target bar code is closer to or further from the imaging system IS from the target distance TD, as can be seen, the center line of the aiming pattern CP diverges from the center line CFV of the field of view FV.

Assuming the intersection point I is near the middle of the working range WR, the amount of divergence is greatest near the limits of the working range WR. If on the other hand the intersection point I is at the far limit of the working range WR, the maximum parallax would be at the near limit of the working range WR. It should be appreciated that, in actuality, because the target distance TD may be on the order of 1 meter (or more) from the imaging system IS, the divergence angle α is much smaller than is shown schematically in FIG. 11. Nevertheless, divergence of the center line CP of the aiming pattern P and the center line CFV of the field of view FV is still problematic because it leads to inaccuracy in aiming of the reader by the user which, especially at the far limit of the working range can result in poor reader performance, i.e., no successful reading of target bar code if reader is not aimed such that target bar code is within the imaging system field of view FV.

Figure 11B:
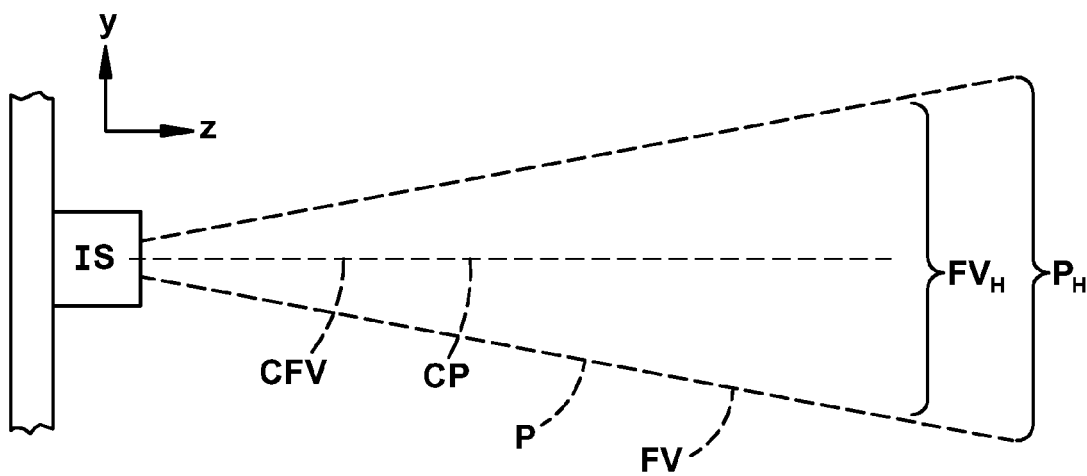

To complete the analysis regarding FIG. 11B, since there is no offset between a center line of the aiming pattern assembly AP and the imaging system IM with respect to the X axis, the center line CP of the aiming pattern would be aligned in the vertical direction with the center line CFV of the field of view FV. This is seen in FIG. 11B. between the., only with respect to the Y axis.

One approach to reducing the divergence angle α would be to reduce the offset between the imaging system IS and the aiming pattern assembly AP, however, the extent of such reduction in offset is limited by the physical footprint or size of the components of the imaging system and the aiming pattern assembly. Moreover, the imaging system IS and the aiming pattern assembly AP cannot be coaxial with respect to the optical axis because one would block the other, that is, if the aiming pattern assembly AP was positioned along the optical axis OA in front of the imaging system IS, the imaging system would be blocked from receiving light from the field of view FV. Similarly if the imaging system IS were positioned in front of the aiming pattern assembly AP, the aiming pattern would be blocked by the sensor of the imaging system IS. Thus, there will always be some offset at least with respect to one axis orthogonal to the imaging system optical axis OA and, therefore, some degree of parallax, between the imaging system optical axis OA and the aiming pattern assembly AP.

Advantageously, the aiming pattern assembly or system 60 of the present invention generates at least two aiming patterns P1, P2 (best seen in FIGS. 6, 10 and 12A & 12B) to aid the user in aiming the reader 10 at the target bar code 34 when using the reader 10 in the hand-held mode. The use of two aiming patterns P1, P2 mitigates the problem of parallax which is caused by the offset between the imaging lens assembly 26 and the aiming pattern assembly 60 in the Y direction. In the X direction, it is assumed that there is no offset and no parallel because the optical axis OA of the imaging lens assembly 26 is vertically aligned with the longitudinal axis LA of the aiming pattern assembly 60 (as was shown and explained with regard to prior art FIG. 11B).

Assume that the working range WR of the imaging system 12 may be divided into two non-overlapping regions within the field of view FV, a near working range region NWR that is closer to the reader 10 and a far working range region FWR that is more distant from the reader 10. The respective extents of the near and far working ranges NWR, FWR may each comprise 50% of the total working range WR. Alternately, depending on environmental conditions, the optical properties of the imaging lens assembly 26 or other factors, the split may be different, e.g., 40% of the total working range WR allocated to the near working range NWR and 60% for the far working range FWR. Further assume that the field of view FV of the imaging system may be characterized by a center line CFV through the field of view FV. Generally, the field of view center line will be collinear with the optical axis OA of the imaging lens assembly 26. The field of view FV of the imaging system may also be characterized by a plane PFV within the field of view FV that is orthogonal to a direction D of an offset OF between the pattern aiming assembly 60 and the optical axis OA of the imaging lens assembly 26. For example, in the side elevation views shown FIGS. 12A & 12B, the direction D of the offset OF between a longitudinal axis LA of the aiming pattern assembly 60 and the optical axis OA of the camera assembly 20 is vertical or in the Y direction. In the schematic perspective view of FIG. 12C, the plane PFV is shown and as can be seen the plane PFV is a horizontal plane within the imaging system field of view FV. The plane PFV includes the center line CFV of the field of view FV and is intersected by a center line CP1 of the aiming pattern P1 at point I1 and by a center line CP2 of the center line CP2 of the aiming pattern P2 at point I2 in the schematic perspective view of FIG. 12C. It is presumed that in the X direction the aiming pattern assembly 60 is substantially in alignment (not offset) with the optical axis OA of the camera assembly 20.

Figure 12A:
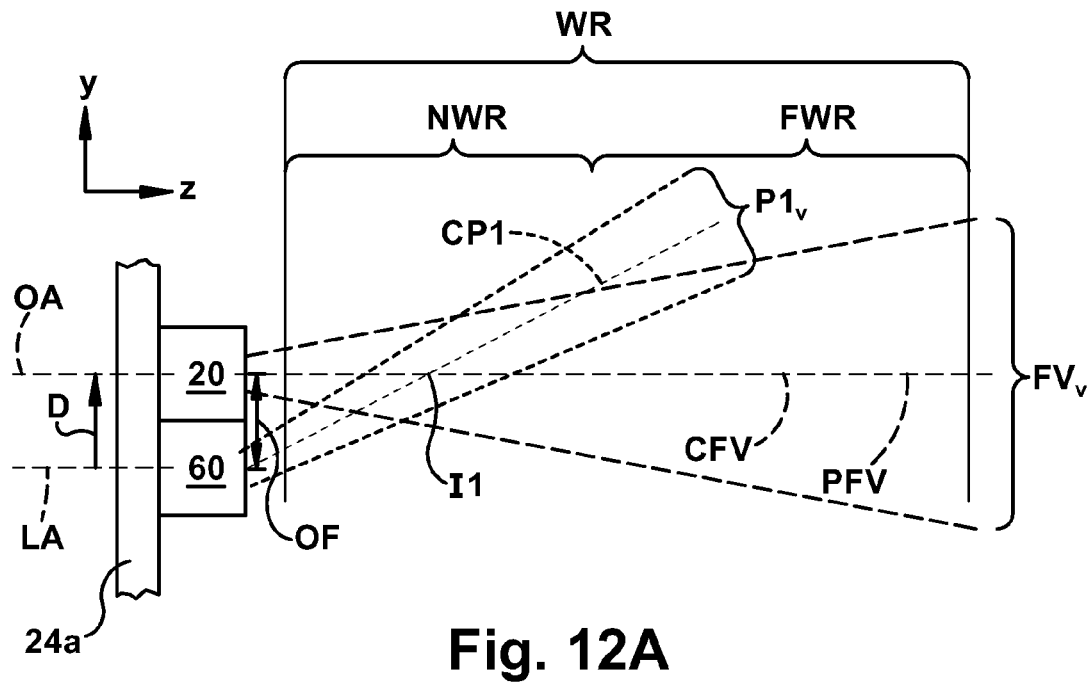
FIG. 12A is a schematic side elevation view illustrating the intersection of a center line of the field of view of an imaging system and a center line of the first aiming pattern of the aiming pattern assembly of FIG. 6.
Figure 12B:
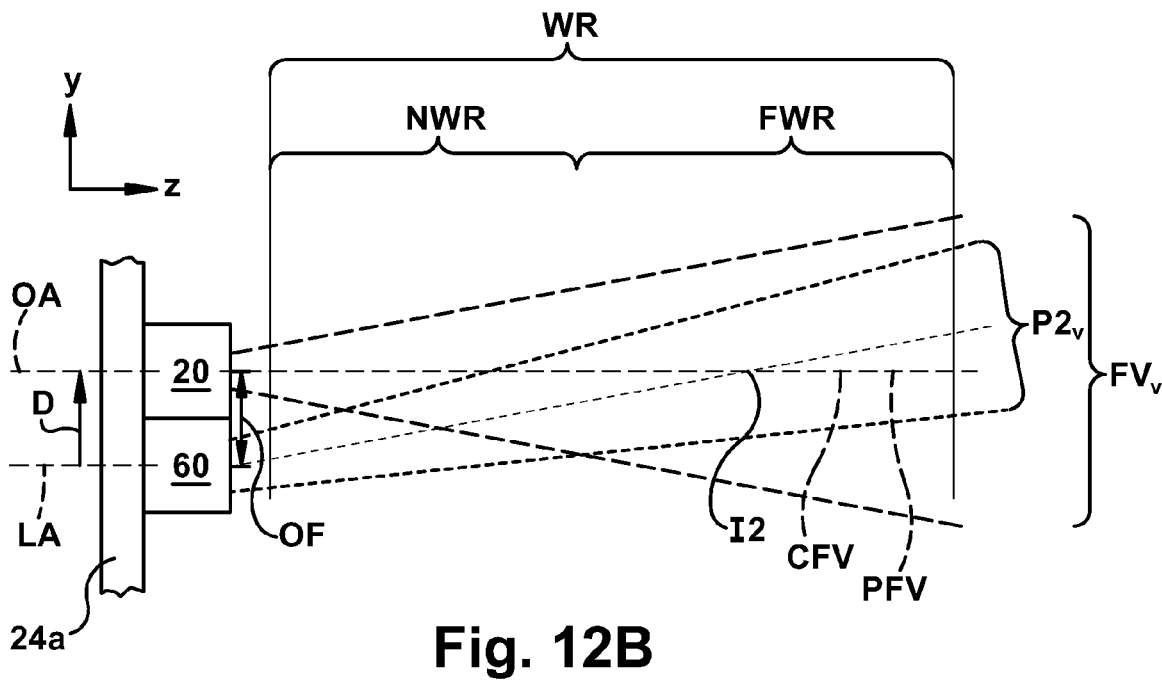
FIG. 12B is a schematic side elevation view illustrating the intersection of a center line of the field of view of an imaging system and a center line of the second aiming pattern of the aiming pattern assembly of FIG. 6.
Figure 12C:
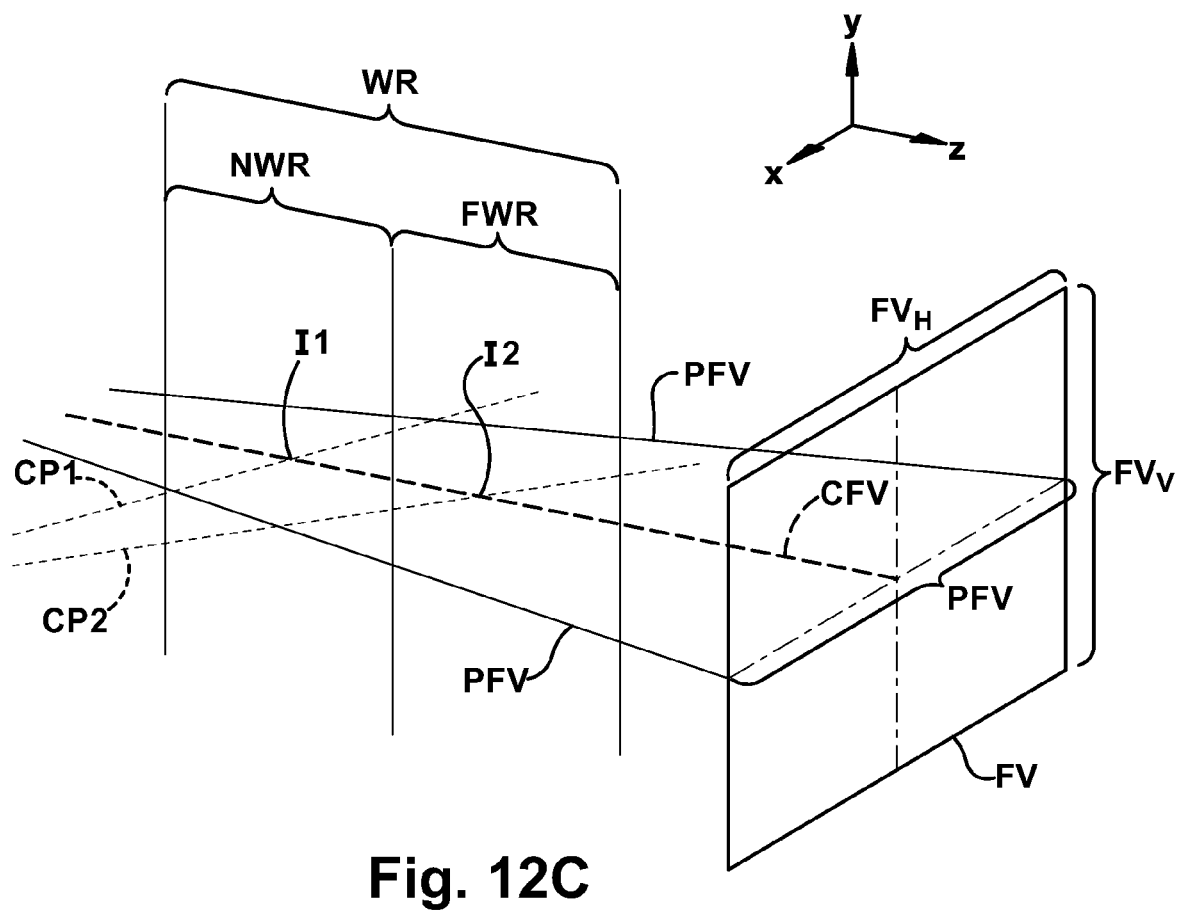
FIG. 12C is a schematic perspective view illustrating the intersection of a plane of the field of view of an imaging system that is orthogonal to a direction of offset between the imaging system optical axis and the aiming pattern assembly of FIG. 6.

As shown schematically in FIG. 12C, the center line CP1 of the aiming pattern P1 generated by the aiming pattern assembly 60 will intersect the plane PFV of the field of view FV within the near working range NWR and the center line CP2 of the aiming pattern P2 generated by the aiming pattern assembly 60 will intersect the plane PFV of the field of view FV within the far working range FWR. Assuming aiming pattern assembly 60 and the imaging lens assembly 26 are aligned vertically, that is, no offset OF in the horizontal or X direction, the center line CP1 of the aiming pattern P1 will intersect at the point I1 (FIG. 12A) the center line CFV of the field of view FV in the near working range NWR and the center line CP2 of the aiming pattern P2 will intersect at point I2 (FIG. 12B) the center line CFV of the field of view FV in the far working range FWR.

Note that both patterns P1, P2 are block-type aiming patterns and at point I1, an extent or bounds of the pattern P1 is generally congruent with the extent of the field of view FV at I1 and at point I2, an extent or bounds of the pattern P2 is generally congruent with the extent of the field of view FV at I2.

If the target bar code 34 is determined by the imaging system 12 to be within the near working range NWR, the aiming pattern P1 will be activated by the imaging system 12 to aid the user in properly aiming the reader housing 16 at the target bar code 34. On the other hand, if the target bar code 34 is determined to be within the far working range FWR, the aiming pattern P2 will be activated by the imaging system 12 to aid the user in properly aiming the reader housing 16 at the target bar code 34. Since the center line CP1 of the first aiming pattern P1 is more congruent with the field of view center line CFV over the near working range NWR and the second aiming pattern P2 is more congruent with the field of view center line CFV over the far working range, the use of two aiming patterns reduces or mitigates aiming error resulting from offset and parallax of the aiming pattern assembly 60 and the imaging system 12.

As can best be seen in FIG. 6, the aiming pattern assembly 60 of the present invention includes a light source assembly 62, a pattern shaping element or assembly 66, and a pattern selection assembly 68. The components of the aiming pattern assembly 60 are supported within a holder 61 which is affixed to the printed circuit board 24a.

The light source assembly 62 includes a source of visible light (e.g., light in a wavelength range of approximately 400 nm. to 750 nm.) such as a laser diode 63 supported within a housing 64 affixed to the printed circuit board 24a. The laser diode 63 generates a diverging beam 63a (FIG. 6) of coherent visible light, generally elliptical in cross section, which is received by a collimating lens 65. The collimating lens 65 focuses the diverging laser beam into a cylindrical-shaped beam, which when viewed in cross section is a circular or slightly elliptical pattern of light 65a, projected toward the pattern shaping element 66. The cross-section of the light pattern 65a is sufficient in size to intersect both portions or zones 66a, 66b of the pattern shaping element 66. The collimating lens 65 focuses the laser beam 63a such that, in conjunction with the pattern shaping element 66, the aiming pattern P1 has a sharp focus in the near working range NR and the aiming pattern P2 has a sharp focus in the far working range FWR. Advantageously, the light emitted by the laser diode 63 is polarized light, a characteristic which, as will be explained below, will be utilized by the pattern selection assembly 68.

Alternately, the light source 63 of the light source assembly 62 may be a light emitting diode (LED) that emits light within the visible spectrum. In order to obtain polarized light, a polarizing filter, either integral with the LED or positioned downstream of the LED would be provided to polarize the light generated by the LED. The polarized LED light would be collimated by the collimating lens 65, as discussed above. While the use of the polarizing filter in this embodiment does significantly reduce the amount of light received by the collimating lens 65 because of the filtering, however, this embodiment allows the use of a relatively inexpensive LED as opposed to a laser diode.

The aiming pattern assembly 60 further includes the pattern shaping element 66 (FIG. 7). The pattern shaping element 66 is comprises a refractive optical element or lens that receives the circular or elliptical pattern of focused light 65a from the collimating lens 65. Alternately, the pattern shaping element may comprise a diffractive optical element or lens or a combination of refractive and diffractive optical elements. The pattern shaping element 66 includes at least two non-overlapping zones or regions 66a, 66b. The optical characteristics of the regions 66a, 66b are configured such that when the light 65a focused by the collimating lens 65 strikes the regions 66a, 66b of the pattern shaping element 66, the region 66a shapes the light 65a to generate the first aiming pattern P1 and the region 67b shapes the light 65a to generate the second aiming pattern P2.

Each zone or region 66a, 66b of the pattern shaping element 66 may, as necessary, a positive or negative optical power to provide a desired size of the aiming patterns. For example, the optical power of region 66a may be empirically determined and set such that the size of the first aiming pattern P1 is sharply defined and substantially congruent with the size of the field of view FV within the near working range NWR and the optical power of region 66b may be empirically determined and set such that the size of the second aiming pattern P2 is sharply defined and substantially congruent with the size of the field of view FV with the far working range FWR.

A detailed analysis of a refractive optical element or lens suitable for use in shaping a laser beam into an aiming pattern is found in U.S. Published Application Pub. No. US 2005/0284942 A1, published Dec. 29, 2005 (application Ser. No. 10/879,333, filed Jun. 29, 2004) to Gurevich et al. The '942 published application is assigned to the assignee of the present application is incorporated herein in its entirety by reference. A detailed analysis of a refractive optical element or lens for use in shaping a laser beam is found in U.S. Pat. No. 6,021,106, issued Feb. 1, 2000 to Welch et al. The '106 patent is incorporated herein in its entirety by reference.

Figure 10:
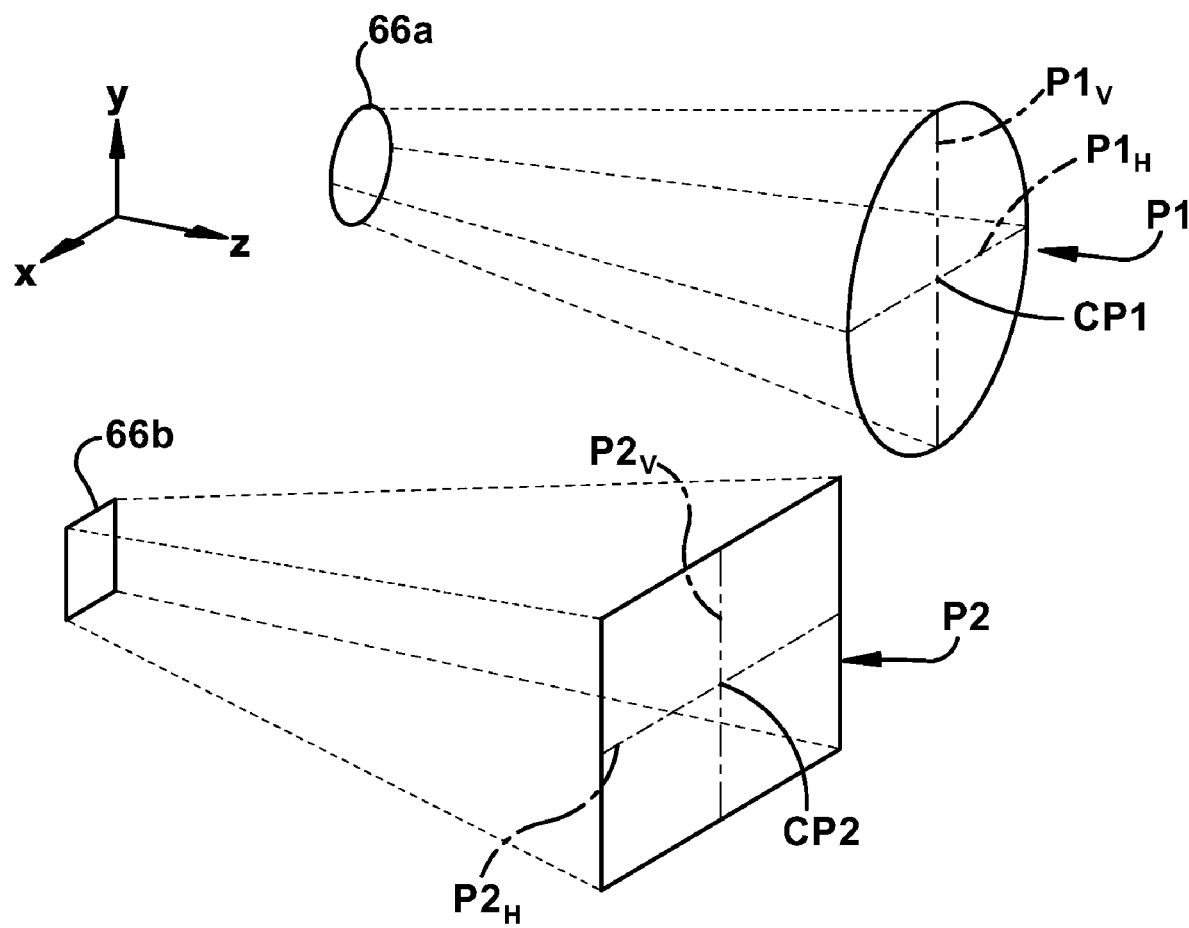
FIG. 10 provides schematic representations of the first and second aiming patterns generated by the aiming pattern assembly of FIG. 6.

As noted above, in one exemplary embodiment, the aiming patterns are block-type aiming patterns P1, P2, with P1 being generally circular and P2 being generally rectangular (FIG. 10). However, it should be appreciated that the aiming patterns P1, P2 may be other than the shape shown, depending on the optical properties of the pattern shaping element 66 and may be other than block-type aiming patterns, if desired, e.g., crosshair or dot aiming patterns.

As seen in FIG. 6, the light comprising the aiming patterns P1, P2 is received by the pattern selection assembly 68. The pattern selection assembly 68 comprises a liquid crystal element 69 followed downstream by a polarizing filter or element 70. The pattern selection assembly 68 determines which, if any, of the two aiming patterns P1, P2 are to be passed and which, if any, are to be blocked. As is best seen in FIG. 8, the liquid crystal element 69 includes two regions 69a, 69b that conform to and are aligned with the zones 66a, 66b of the pattern shaping element 66 such that aiming pattern P1 strikes region 69a and aiming pattern P2 strikes region 69b.

Electrical power is independently provided to regions 69a, 69b of the liquid crystal element via circuitry 71 that operates under the control of the imaging system 12. Because the circuitry 71 includes two switches 72a, 72b, the regions 69a, 69b may be energized independently. Since the laser diode emits polarized light, that is, the light has a particular orientation of its polarization. As can be seen in FIGS. 9A & 9B, where the direction of polarization of the patterns P1, P2 are schematically represented by arrows representing direction of polarization, when appropriate electrical power is applied to a region, for example, region 69a of the liquid crystal element 69, the light comprising aiming pattern P1 passes through the liquid crystal element 69 without rotation. This is shown in FIG. 9A, where the direction of polarization of P1 is unchanged as the light pattern P1 passes through the liquid crystal element 69.

On the other hand, looking at FIG. 9A, when no electrical power is applied to a region, for example region 69b of the liquid crystal element 69 has no electrical power applied to it. Thus, for the light pattern P2 upon passing through the liquid crystal element 69, the direction of polarization of the light pattern P2 is rotated approximately 90° with respect to the axis of propagation of the light as the light pattern. FIG. 9B shows the converse situation, namely, electrical power is applied to region 69b resulting in P2 passing without polarization rotation, while no power is applied to region 69a resulting in a 90° rotation of the direction of polarization.

The polarizing filter 70 is characterized by a polarizing axis PA. If light incident on the polarizing filter 70 has a direction of polarization which coincides with the direction of the polarizing axis PA, then the incident light passes through the polarizing filter 70 with essentially no attenuation. If, on the other hand, light incident on the polarizing filter 70 has a direction of polarization is approximately 90° off with respect to the direction of the polarizing axis PA, then the incident light is effectively blocked.

If an aiming pattern has not been rotated by the liquid crystal element 69, then the light of the aiming pattern coincides with the direction of the polarizing axis PA of the polarizing filter 70. For example, carrying through the example above regarding FIG. 9A, the non-rotated polarization light pattern P1 would pass through the polarizing filter 70 while the rotated polarization light pattern P2 would be effectively blocked by the polarizing filter 70. FIG. 9B shows the opposite situation, namely, the non-rotated polarization light pattern P2 would pass through the polarizing filter 70 while the rotated polarization light pattern P1 would be effectively blocked by the polarizing filter.

Under certain conditions, for example in extremely high ambient light conditions, it may be desirable to simultaneously emit both aiming patterns P1, P2. Since the circuitry 71 is capable of independently energizing each region 69a, 69b of the liquid crystal element 69, it is possible for the imaging system 12 to selectively generate P1 or generate P2, or generate both aiming patterns P1, P2 simultaneously. Further, the imaging system 12 may strobe P1 or strobe P2 or strobe both aiming patterns with simulataneously or alternately at a desired duty rate. Generally, the aiming pattern assembly 60 is disabled when the imaging system 12 images the target bar code 34 to avoid have the aiming pattern P1, P2 appear in the captured image frames 82 and compromise the quality of the imaged target bar code 34a.

It should be noted that it is not necessary that the central zone 66a of the pattern shaping element 66 be circular and within a center of zone 66b. This is simply one embodiment, other combinations of multiple zones would be possible and within the purview of one of skill in the art, for example the zone 66a, 66b could form an alternating 3×3 checkerboard pattern of portions comprising zones 66a, 66b. However, whatever the shape decided upon for the zone 66a and the zone 66b of the pattern shaping element 66, the respective regions 69a, 69b of liquid crystal element must coincide and be aligned with the respective zones 66a, 66b.

Determination of whether the target bar code 34 is within the working range WR and, if so, whether it is within the near working range NWR or the far working range FWR of the field of view FV is determined by the imaging system 12, for example, by range finding circuitry of the imaging system 12. One suitable example of a range finding system that uses a laser beam to find the range of a target object is found in U.S. Ser. No. 10/903,792, filed Jul. 30, 2004 and entitled "Automatic Focusing System for Imaging-Based Bar Code Reader." The '792 application is assigned to the assignee of the present invention and is incorporated herein in its entirety by reference. Alternately, the imaging system 12 could provide the capability for the user of the reader select between aiming patterns P1 and P2 using an input such as the trigger 16e, if it was deemed that the user would be able to accurately judge whether the target bar code 34 was within the near working range NWR or the far working range FWR of the reader 10.

While the present invention has been described with a degree of particularity, it is the intent that the invention includes all modifications and alterations from the disclosed design falling with the spirit or scope of the appended claims.

We claim:

1. An aiming pattern assembly for an imaging-based bar code reader wherein the bar code reader includes an imaging system generating image frames of a target object within a field of view and having a working range over which a target bar code within the field of view is capable of being imaged and decoded, the working range being subdivided into a near range and a non-overlapping far range, the near range being closer to the reader and the far range being further from the reader, the aiming pattern assembly comprising:

a light source assembly generating focused light;

a pattern shaping assembly receiving focused light from the light source assembly and including a first area and a non-overlapping second area, focused light passing through the first area creating a first aiming pattern projected toward the field of view and passing through the second area creating a second aiming pattern projected toward the field of view, a center line of the first aiming pattern intersecting a center line of the field of view within the near range of the working range and a center line of the second aiming pattern intersecting the center line of the field of view within the far range of the working range; and a pattern selection assembly receiving the first and second aiming patterns and passing at least one of the first and second aiming patterns.

2. The aiming pattern assembly of claim 1 wherein the pattern selection assembly passes a selected one of the first and second aiming patterns and blocks the other of the first and second aiming patterns.

3. The aiming pattern assembly of claim 1 wherein the pattern selection assembly passes the first aiming pattern when a target bar code is determined to be within the near range of the working range and passes the second aiming pattern when a target bar code is determined to be within the far range of the working range.

4. The aiming pattern assembly of claim 1 wherein the light source assembly generates polarized light and includes a laser light source emits light within a visible spectrum.

5. The aiming pattern assembly of claim 4 wherein the pattern selection assembly comprises a liquid crystal element and a polarizing filter.

6. An imaging-based bar code reader comprising:

an imaging system generating image frames of a target object within a field of view and having a working range over which a target bar code within the field of view is capable of being imaged and decoded, the working range being subdivided into a near range and a non-overlapping far range, the near range being closer to the reader and the far range being further from the reader; and an aiming pattern assembly for generating a visible aiming pattern to facilitate aiming the reader at the target bar code, the aiming pattern assembly including:

a light source assembly generating focused light;

a pattern shaping assembly position receiving focused light from the light source assembly and including a first area and a non-overlapping second area, focused light passing through the first area creating a first aiming pattern projected toward the field of view and passing through the second area creating a second aiming pattern projected toward the field of view, a center line of the first aiming pattern intersecting a center line of the field of view within the near range of the working range and a center line of the second aiming pattern intersecting the center line of the field of view within the far range of the working range; and a pattern selection assembly receiving the first and second aiming patterns and passing at least one of the first and second aiming patterns.

7. The imaging-based bar code reader of claim 6 wherein the pattern selection assembly passes a selected one of the first and second aiming patterns and blocks the other of the first and second aiming patterns.

8. The imaging-based bar code reader of claim 6 wherein the pattern selection assembly passes the first aiming pattern when a target bar code is determined to be within the near range of the working range and passes the second aiming pattern when a target bar code is determined to be within the far range of the working range.

9. The imaging-based bar code reader of claim 6 wherein the light source assembly generates polarized light includes a laser light source that emits light in the visible spectrum.

10. The imaging-based bar code reader of claim 9 wherein the pattern selection assembly comprises a liquid crystal element and a polarizing filter.

11. A method of generating an aiming pattern to facilitate the aiming of an imaging-based bar code reader at a target bar code wherein the bar code reader includes an imaging system generating image frames of a field of view and has a working range over which a target bar code within the field of view is capable of being imaged and decoded, the working range being subdivided into a near range and a non-overlapping far range, the near range being closer to the reader and the far range being further from the reader, the steps of the method comprising:

providing an aiming pattern assembly including: a light source assembly generating focused light; a pattern shaping element position receiving focused light from the light source assembly and including a first area and a non-overlapping second area, focused light passing through the first area creating a first aiming pattern projected toward the field of view and passing through the second area creating a second aiming pattern projected toward the field of view, a center line of the first aiming pattern intersecting a center line of the field of view within the near range of the working range and a center line of the second aiming pattern intersecting the center line of the field of view within the far range of the working range; and a pattern selection assembly receiving the first and second aiming patterns and passing at least one of the first and second aiming patterns;

determining if a target bar code is within the near range or the far range of the working range; and passing the first aiming pattern if the target bar code is determined to be within the near range of the working range and passing the second aiming pattern if the target bar code is determined to be within the far range of the working range.

12. An aiming pattern assembly for an imaging-based bar code reader wherein the bar code reader includes an imaging system generating image frames of a target object within a field of view and having a working range over which a target bar code within the field of view is capable of being imaged and decoded, the working range being subdivided into a near range and a non-overlapping far range, the near range being closer to the reader and the far range being further from the reader, the aiming pattern assembly being offset from the imaging system in an offset direction that is perpendicular to an optical axis of the imaging system, the aiming pattern assembly comprising:

a light source assembly generating focused light;

a pattern shaping element receiving focused light from the light source assembly and including a first area and a non-overlapping second area, focused light passing through the first area creating a first aiming pattern projected toward the field of view and passing through the second area creating a second aiming pattern projected toward the field of view, a center line of the first aiming pattern intersecting a plane through a center line of the field of view within the near range of the working range, the plane being orthogonal to the offset direction and a center line of the second aiming pattern intersecting the plane through the center line of the field of view within the far range of the working range; and a pattern selection assembly receiving the first and second aiming patterns and passing at least one of the first and second aiming patterns.

13. The aiming pattern assembly of claim 12 wherein the pattern selection assembly passes a selected one of the first and second aiming patterns and blocks the other of the first and second aiming patterns.

14. The aiming pattern assembly of claim 12 wherein the pattern selection assembly passes the first aiming pattern when a target bar code is determined to be within the near range of the working range and passes the second aiming pattern when a target bar code is determined to be within the far range of the working range.

15. The aiming pattern assembly of claim 12 wherein the light source assembly generates polarized light and includes a laser light source which emits light in the visible spectrum.

16. The aiming pattern assembly of claim 15 wherein the pattern selection assembly comprises a liquid crystal element and a polarizing filter.

17. An imaging-based bar code reader comprising:

an imaging system generating image frames of a target object within a field of view and having a working range over which a target bar code within the field of view is capable of being imaged and decoded, the working range being subdivided into a near range and a non-overlapping far range, the near range being closer to the reader and the far range being further from the reader; and an aiming pattern assembly being offset from the imaging system in an offset direction that is perpendicular to an optical axis of the imaging system, the aiming pattern assembly including:

a light source assembly generating focused light;

a pattern shaping element receiving focused light from the light source assembly and including a first area and a non-overlapping second area, focused light passing through the first area creating a first aiming pattern projected toward the field of view and passing through the second area creating a second aiming pattern projected toward the field of view, a center line of the first aiming pattern intersecting a plane through a center line of the field of view within the near range of the working range, the plane being orthogonal to the offset direction and a center line of the second aiming pattern intersecting the plane through the center line of the field of view within the far range of the working range; and a pattern selection assembly receiving the first and second aiming patterns and passing at least one of the first and second aiming patterns.

18. The imaging-based bar code reader of claim 17 wherein the pattern selection assembly passes a selected one of the first and second aiming patterns and blocks the other of the first and second aiming patterns.

19. The imaging-based bar code reader of claim 17 wherein the pattern selection assembly passes the first aiming pattern when a target bar code is determined to be within the near range of the working range and passes the second aiming pattern when a target bar code is determined to be within the far range of the working range.

20. The imaging-based bar code reader of claim 17 wherein the light source assembly generates polarized light and includes a laser light source which emits light in the visible spectrum.

21. The imaging-based bar code reader of claim 20 wherein the pattern selection assembly comprises a liquid crystal element and a polarizing filter.

22. The imaging-based bar code reader of claim 17 wherein the light source assembly generates polarized light and includes an LED which emits light in the visible spectrum and a polarizing lens to polarize the light emitted by the LED.

23. The imaging-based bar code reader of claim 22 wherein the pattern selection assembly comprises a liquid crystal element and a polarizing filter.

* * * * *

UNITED STATES PATENT AND TRADEMARK OFFICE
CERTIFICATE OF CORRECTION

| | | |
|---|---|---|
| PATENT NO. | : 7,686,223 B2 | Page 1 of 1 |
| APPLICATION NO. | : 11/848638 | |
| DATED | : March 30, 2010 | |
| INVENTOR(S) | : Vinogradov et al. | |

It is certified that error appears in the above-identified patent and that said Letters Patent is hereby corrected as shown below:

In Column 5, Line 6, delete "range" and insert -- range. --, therefor.

In Column 8, Line 40, delete "(CFL))" and insert -- (CCL)) --, therefor.

In Column 10, Line 43, delete "11B." and insert -- 11B --, therefor.

In Column 14, Line 33, delete "simulataneously" and insert -- simultaneously --, therefor.

Signed and Sealed this
Nineteenth Day of June, 2012

David J. Kappos
*Director of the United States Patent and Trademark Office*